March 22, 1960  F. O. HELTZEL  2,929,311
ROTISSERIE BARBECUE DEVICE
Filed May 10, 1956  5 Sheets-Sheet 1

INVENTOR.
FRANCIS O. HELTZEL
BY
ATTORNEY

March 22, 1960  F. O. HELTZEL  2,929,311
ROTISSERIE BARBECUE DEVICE
Filed May 10, 1956  5 Sheets-Sheet 3

INVENTOR.
FRANCIS O. HELTZEL
BY
ATTORNEY

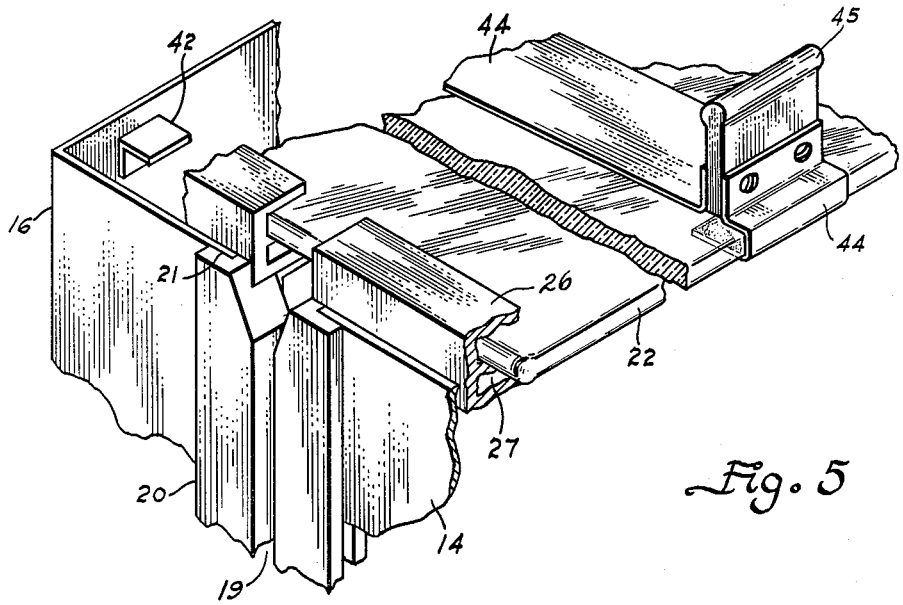
Fig. 5
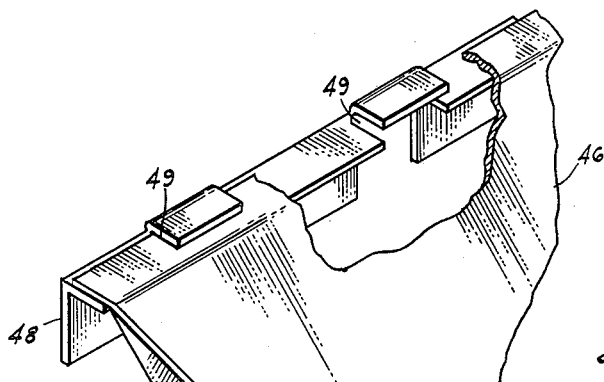
Fig. 6
INVENTOR.
FRANCIS O. HELTZEL
BY
ATTORNEY
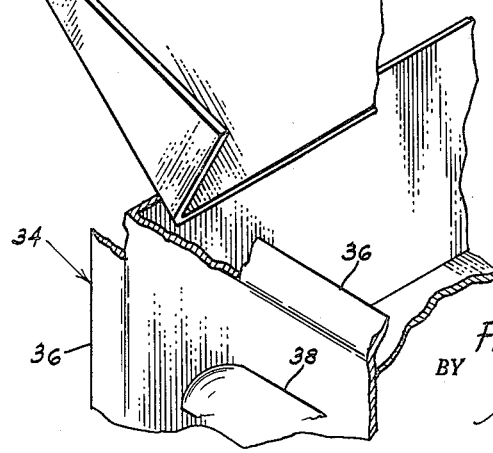

March 22, 1960 F. O. HELTZEL 2,929,311
ROTISSERIE BARBECUE DEVICE
Filed May 10, 1956 5 Sheets-Sheet 5

INVENTOR.
FRANCIS O. HELTZEL
BY
ATTORNEY

United States Patent Office 2,929,311
Patented Mar. 22, 1960

2,929,311

ROTISSERIE BARBECUE DEVICE

Francis O. Heltzel, York, Pa.

Application May 10, 1956, Serial No. 583,958

4 Claims. (Cl. 99—421)

This invention relates to improvements in rotisserie barbecue construction or devices and particularly in devices of this type which are built as units capable of being interconnected for purposes of producing an assembly of various sizes in accordance with the needs of a barbecue establishment. Primarily the invention pertains to devices of this nature having plural spits and including mechanism to rotate said spits selectively or simultaneously.

Various kinds of rotisseries are available which are provided with plural spits. Certain of these devices are provided with plural spits, all of which are arranged vertically and are of sufficient length that various pieces of meats for example or individual chickens or the like may be positioned in vertical arrangement upon said spits. Also, a number of very popular type of barbecue devices have substantially horizontal spits arranged in spaced relationship above each other but all of the spits substantially being in a common vertical plane. The principal objections to barbecue devices of these types are that if it is desired to roast different kinds of meats such as fish and chicken for example upon the same spit in the vertical type of rotisserie or upon different spits in the second type of device wherein the horizontal spits are above or below each other, the renderings and drippings from the uppermost items fall upon the lower items and this is objectionable particularly where substantially unlike products of noticeably different flavors are involved. Further, even if similar products are being roasted exclusively in barbecue devices of these types, the drippings upon the lower items from the upper ones will result in unlike moisture content existing between the items extending from top to bottom in the barbecue device. That is, the uppermost ones will be the driest and the lowermost ones will be much more moist than the upper ones.

A vertical arrangement of horizontal spits, so that they are disposed in a substantially vertical plane for example, also requires relatively complicated mechanism to effect mounting and driving of the spits. In order that an appreciable number of spits might be included in a single barbecue device, it also is necessary that the uppermost spit be relatively high, while the lowermost spit is much lower. In order to load and unload said spits, it accordingly is necessary for the operator to reach substantially in order to handle the uppermost spit and also stoop somewhat to engage the lowermost spit. Problems relative to providing drip pans, where for example individual drip pans for each spit are desired, present themselves and have not been solved very satisfactorily in existing devices of this type.

Further, and more importantly, the matter of expanding an initial unit of existing barbecue devices is not easily accomplished due to the substantial size of most of the devices now available and, where expansion is desired, it is necessary to purchase an entire additional device which for example may include as many as eight spits arranged in two tiers of four spits each. Frequently, such an expansion is more than is necessary but may be the only type obtainable at present.

It is the principal object of the present invention to provide a relatively small and compact basic barbecue unit including for example two spits disposed preferably horizontally and parallel to each other in a horizontal plane, said unit also being constructed so as readily to be interconnected to additional units extending horizontally to one side or the other of the initial unit, whereby indefinite expansion of the initial unit may take place in increments which permit gradual expansion as for example in accordance with the growth of the business of a barbecue establishment.

As a result of the basic nature of the units and assembly of units comprising the present invention, the provision of drip pans is considerably simplified as compared with providing drip pans in conventional types of rotisserie devices and, more importantly, the spits may contain unlike food products either on the same spit or on adjacent spits with no resulting co-mingling of renderings, drippings and the like from one type of product to another.

Another object of the invention is to provide an extremely simple and inexpensive heating unit which, in the preferred embodiment of the invention, comprises a resistance type electric radiant element disposed preferably between the pair of spits in each basic unit of the device, whereby a minimum amount of soiling of the heating unit will occur, yet maximum heating effects are produced.

A further object of the invention is to provide simplified drive means for rotating the spits of the individual units or an assembly of such units, the interengaging elements of the drive means being such as to permit ready connection and dis-connection of the same as when spits are removed from or replaced in the units incident to loading or unloading the spits.

A still further object of the invention is to provide rotisserie barbecue units which make it possible for customers to have a ready view of the top and front side of the unit so as to be able to view the products being roasted in the units, yet be protected from the roasting heat of the units. However, if desired, the construction is such that the top cover plates which are preferably transparent may be removed from the units if it is desired to provide an open-top type of barbecue unit, particularly for outdoor use. In regard to this object of the invention, it also is a further objective to provide transparent, horizontally slidable glass panels for example which cover the entire top of each unit so as to conserve heat and protect the operator and customers alike from said heat during the roasting operations of the unit.

Still another object of the invention is to fabricate the units from as many standard sizes of parts as possible, thereby minimizing manufacturing and assembly costs, the construction also being such that when individual basic units are assembled in adjacent, interconnected relationship, no parts of the original unit need be discarded since the same are utilized in the complete assembly of an indefinite number of such units.

Details of the foregoing objects and of the invention, as well as other objects thereof, are set forth in the following specification and illustrated in the drawings accompanying the same.

In the drawings:

Fig. 4 is a fragmentary vertical elevation, partly broken away and shown in vertical section, illustrating the top glass panels and supporting channels therefor, one of said panels being provided for each basic unit of the barbecue assembly.

Fig. 5 is a fragmentary, perspective view of a portion of one of the top glass panels, the channel supporting means for one end thereof, and part of one of the end sections and rear column members, as well as the manner in which the same are interrelated.

Fig. 6 is a fragmentary, perspective view showing a portion of one of the drip pans of each unit, and one of the deflecting drip plates which discharge into the drip pans.

Figs. 8 through 11 individually show, fragmentarily, in front and side elevations, details of the supporting bearing means for opposite ends of the spit shown in the foregoing figures.

Figure 12:
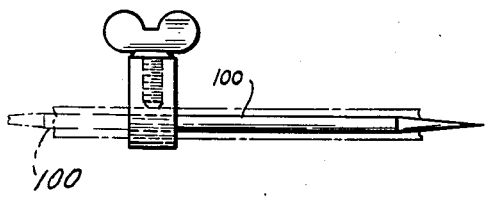
Figure 13:
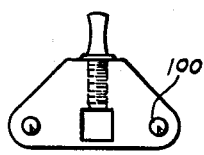

Figs. 12 and 13 respectively show side and end elevational views of an exemplary impaling device used upon the spits to insure rotation therewith of the items being roasted.

Fig. 14 is a fragmentary vertical elevation illustrating the joinder of two base plates of the assembly.

Figure 1:
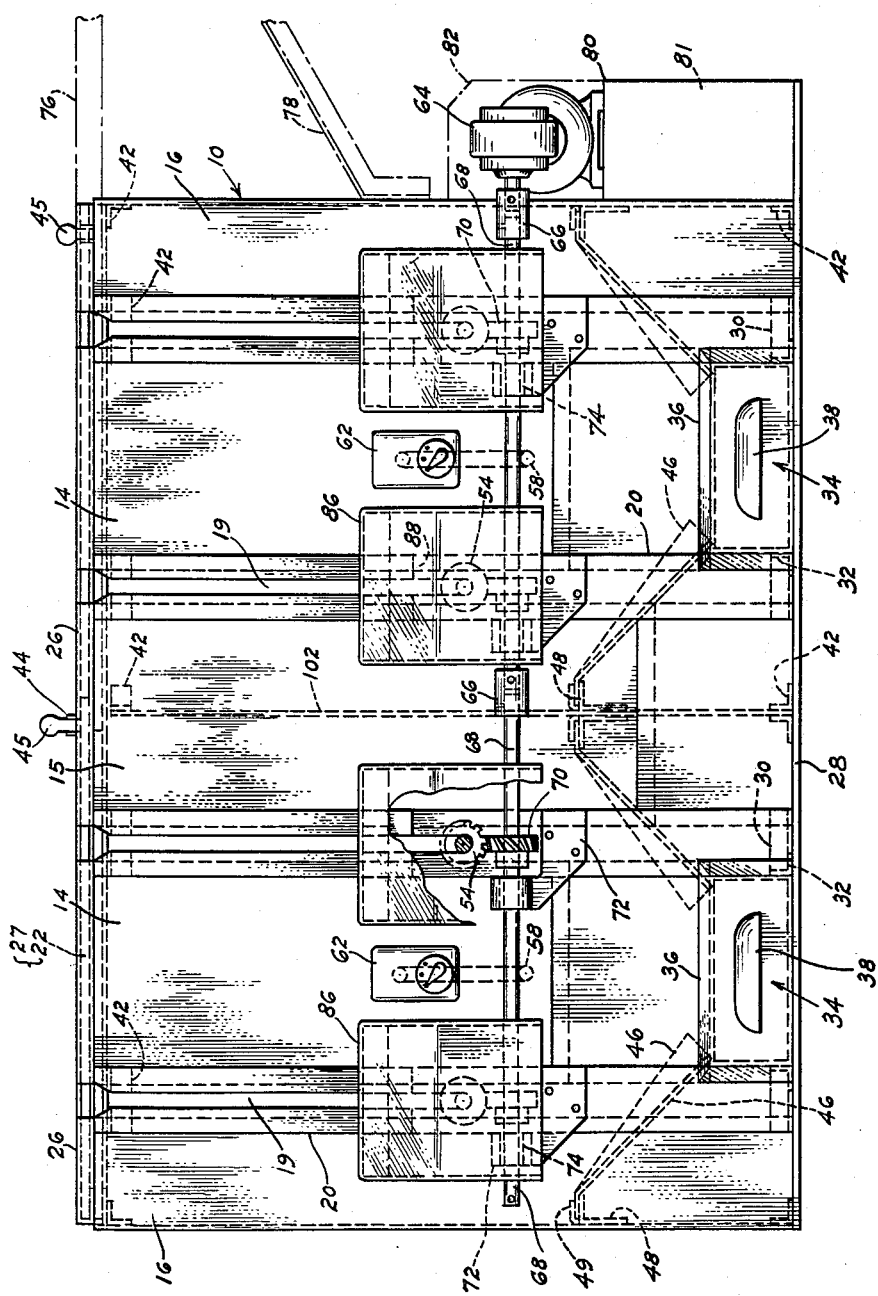
Fig. 1 is a vertical elevation of the rear walls of an assembly of two basic barbecue units embodying the principles of the present invention, each of these units having two spits therein.

Referring to the drawings, and particularly to Fig. 1, a rotisserie barbecue device is illustrated as it would be seen from the operator's or rear side and shows in elevation and partial section a two-unit or four spit machine. This device as illustrated comprises two basic units of preferred construction, each unit including a pair of front column members 18 which support therebetween transparent front panels 12, such as glass, and a pair of rear column members 20, said columns resting upon and being connected to a base 28. Columns 18 and 20 are positioned as to constitute equally spaced vertical supports respectively for the front panels 12 and rear panels 14 and 15, these rear panels 14 and 15 preferably being of sheet metal such as aluminum or stainless steel. The end sections 16 preferably are U-shaped in plan view, as shown in Fig. 5. The panels 14 and 15 and the end sections 16 preferably have rolled or beaded vertical ends which fit snugly into the grooves 21 of column members 18 and 20, as shown in greater detail in plan view in Fig. 3.

Each mating or connecting member is pre-punched or drilled so as to permit additional units of the machine to be added with ease of assembly. This specification and the accompanying drawings describe and illustrate one or more units of two spits each which is the preferred basic embodiment of this invention. Fig. 1 also shows a drip pan 34, together with drip guide plates 46 herein later described in greater detail.

Each basic unit of the rotisserie barbecue cabinet and assembly comprises two pairs of vertical columns 18 and 20 respectively at the front and back thereof, these being secured to the base plate 28 by angle members 30 and 42 on the inside of the unit. The outer edges of columns 18 and 20 are provided with vertical grooves 21 which receive the rolled or beaded vertical edges of the rear wall panels 14 and 15 and the similarly formed edges of the end sections 16. The columns 18 and 20 are held in rigid position by suitable means such as a plurality of angles 42 connected to the upper ends thereof, said angles being secured by fastenings 92 which preferably are flat-head slotted machine screws, as illustrated in Figs. 4 and 14, which are connected to horizontal top channels 24 and 26. The front panels 12 preferably are of glass or other transparent material and have no such fastenings. The vertical edges of panels 12 preferably are snugly received in the grooves 21 of the front column members 18. Also, the transparent panels 12 preferably do not extend entirely to base plate 28. Rather, opaque panels 40, of metal sheet stock or the like extend upwardly between front columns 18 to meet the lower ends of panels 12, thereby also aiding in bracing the columns 18, as well as obscuring the view of drip pans 34.

The top or cover arrangement for each section comprises, for example, horizontally disposed channel members 24 and 26 respectively at the front and back of the unit, which members are supported by clip angles 42 also secured by fasteners 92 to the columns 18 and 20 as shown in Fig. 4. The front channel 24 is continuous along the front top edge of the unit or assembly of units, while the rear channels are interrupted so as to provide spaces between sections thereof permitting easy loading and unloading of the spits 50 into the vertical slot 19 extending downward from the top of each rear column 20. Fig. 5 illustrates this in detail.

Figure 3:
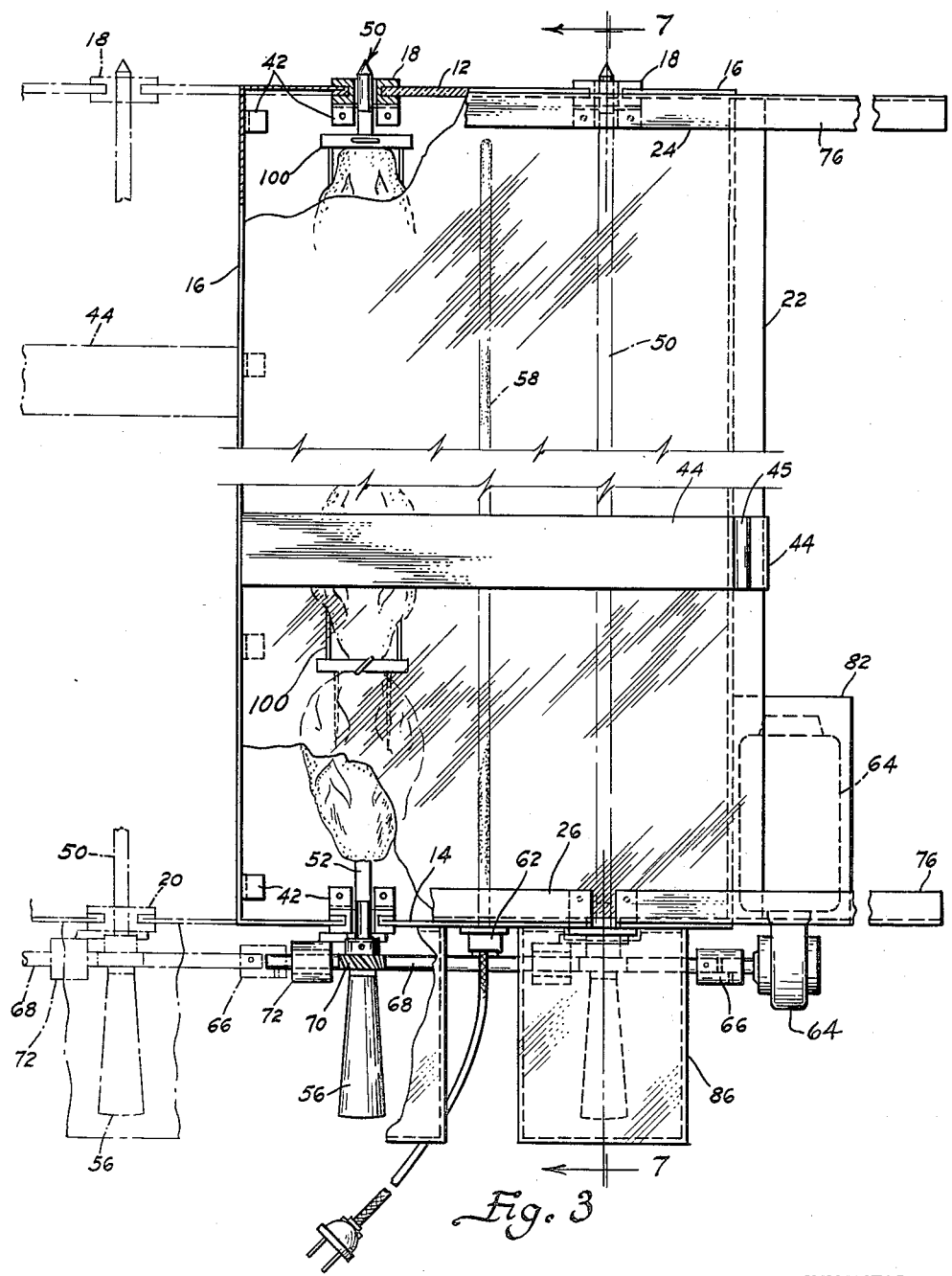
Fig. 3 is a top plan view, partly broken away and illustrated in section to show details, of a single unit embodying the principles of the invention, said unit having a pair of parallel, substantially horizontal spits therein, the view also, in phantom, showing fragmentarily the appearance of another adjoining unit if added to the initial basic unit.

Fig. 5 further illustrates the manner of and means for supporting sliding glass doors or panels 22 in the grooves 27 of the channel members 24 and 26. Where only a single unit of two spits is employed, preferably only one glass panel 22 is included which slides in grooves 27 into extension rails 76 braced by braces 78 supported by one end section 16 of the unit to provide adequate support for the panel 22, as shown in Fig. 1. The length of rails 76 permits said panel to be opened substantially completely to expose the entire top of the unit for easy loading, unloading and cleaning of the machine.

Where two or more units of two spits each are used, each unit has a glass panel 22 but alternate panels are received in the upper and lower grooves 27 of the channel members 24 and 26. In opening or closing any selected panel, the same is free to pass the other panels and permit complete opening of the top of any desired unit for the purposes described. Suitable means for actuating the sliding of the panels is illustrated in Figs. 3, 4 and 5, wherein a preferably heat resisting handle member 45 is secured to strap members 44 so formed as to be clamped to opposite edges of each glass panel 22. Figs. 3 and 4 further show that the straps 44 and handles 45 preferably are disposed in staggered relationship to minimize injury to the operator's hands and fingers. Preferably, the panels 22 are provided with rolled edges at the ends thereof which are slidable in grooves 27 to reduce friction in sliding, as shown in Fig. 5. A modification thereof however is shown in Fig. 4 wherein flat edges of panels 22 engage a plurality of dimples 94 spaced along the flanges forming the grooves 27 of the channels 24 and 26.

Figure 7:
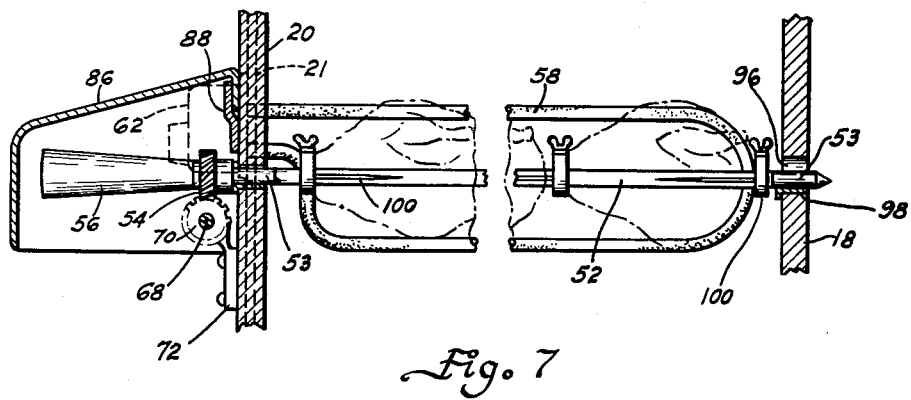
Fig. 7 is a vertical sectional view, foreshortened, taken on the lines 7—7 of Fig. 3 and illustrating details of one of the spits in each barbecue unit, the drive means therefor, and an exemplary heating unit provided in each barbecue unit.
Figure 8:
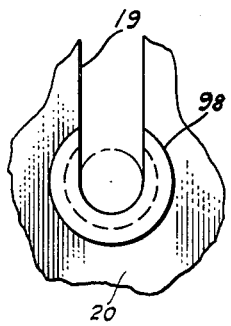
Figure 9:
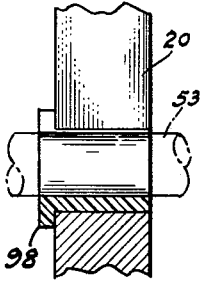
Figure 10:
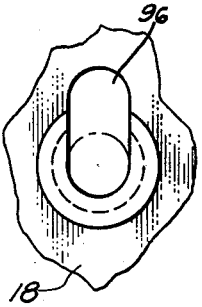
Figure 11:
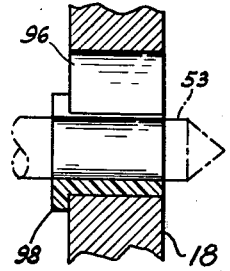

Each spit 50 shown in Figs. 1, 3 and 7 comprises preferably a square bar 52, the ends of which are machined to provide cylindrical portions 53 which engage preferably self-lubricated bearings 98 in the column members 18 and 20. These bearings are illustrated in elevation and section in Figs. 8 through 11. As shown in section in Fig. 7, the spit 50 has a handle 56 securely locked on one end thereof. This handle preferably is heat resistant and is used as a means for handling the spit while loading and unloading it.

A gear 54 is also locked to the same end of each spit and is so positioned thereupon as to engage a mating gear 70 on the driving shaft 68. Such mating or disconnecting of these gears is accomplished simply by lowering or raising the handle end of each spit. All illustrations of the gears 54 and 70 show them preferably to be of a 45 degree pitch angle, bevel tooth type. One major advantage in this selection is that with a single rotation of the shaft 68, with the shaft always rotating in the same direction, an alternate positioning of right and left hand teeth of the gears 54 and 70 is possible so successive pairs of spits 50 rotate respectively in opposite directions. Another object of such selection is that the resultant thrust caused by this rotation will always be towards the machine and, as shown in Fig. 7, a surface shown therein as the hub face of gear 54 places such thrust against a shoulder or extended face of the adjacent bearing 98 in column 20.

Figure 2:
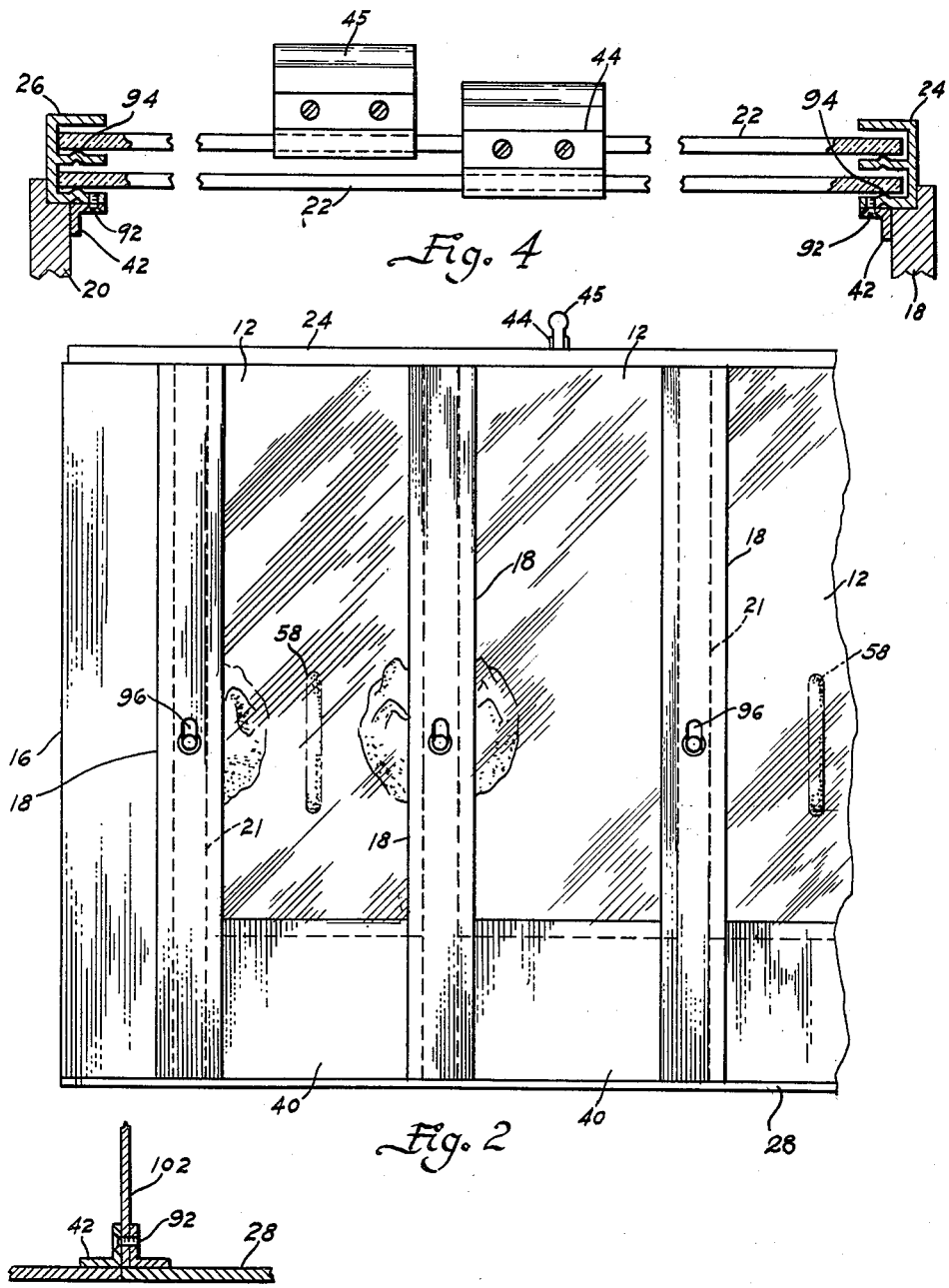
Fig. 2 is a partially fragmentary vertical elevation showing the front wall of the barbecue unit assembly illustrated in Fig. 1, this being the wall customarily viewed by the customer and the glass panels therein permitting viewing of the products being prepared in the unit.

Positioned directly between the pair of spits 50 in each rotisserie unit, as clearly illustrated in Figs. 1, 2 and 3 is a heating element 58, so formed as shown in Fig. 7, as to have the linear or horizontal heating surfaces equidistant from the rotating surfaces of the items being cooked on said pair of spits. This assures uniformity of roasting and moisture content control of the product. Further, uniform roasting of food products with a minimum number of heating elements is afforded. Each heating unit 58 preferably is so mounted relative to the back of switch box 62 that it may be taken off readily for cleaning purposes. Also the units preferably are of electric resistance, radiant type but the basic aspects of the invention are not to be restricted to this specific type or nature of heating means. The switch box 62 preferably has a variable control such as a multi-unit switch for affording variable cooking temperatures.

To insure that the product to be cooked rotates with the spit 50, the invention preferably includes also a plurality of spear-like impaling members 100 which in addition to the spit rod 52 impale the product. Exemplary impaling means are shown in Figs. 12 and 13, which utilize a square opening so as nonrotatably to engage the square portion of spits 52 and may be locked thereto by a thumb-screw or otherwise but preferably not so tightly as to prevent reasonable cooking expansion of the product.

The rotisserie barbecue machine comprising the invention preferably is driven by a motor 64 illustrated in Figs. 1 and 3 as having a ninety degree output shaft connected to drive shaft 68 by a coupling 66. Shaft 68 is supported in bearings 74 mounted in brackets 72 which are fastened to the rear face of columns 20 as shown in Fig. 1. A plurality of driving gears 70 are positioned on shaft 68 so as to engage and rotate respectively the spit gears 54. This horizontal driving means is so designed as to permit ease of assembly when an additional number of two-spit units are desired, a suitable length of shaft 68 being carried by each unit and the adjoining shaft sections being connected readily by couplings 66.

The motor is supported by suitable means 80 attached to the machine and may be so designed as to afford a storage area 81 therein for cooking utensils, condiments or the like. A cover 82 preferably is provided to conceal the motor and prevent splashing of necessary lubricants.

Additional covers preferably are provided at the rear of each spit drive to cover the gears 54 and 70, as well as handles 56. This cover 86 is so designed as to be quickly removable when preparing to load or unload the spits. Fig. 7 shows in section suitable exemplary means for supporting each cover 86, the back flange of each cover being engaged for example in a narrow space or clearance between the clip-like supports 88 and the face of the column members 20 to which supports 88 are fastened. The removal of this cover 86 completely exposes the slot 19 in the column member 20, permitting the handle end of spit 50 to be raised slightly and then be pulled rearwardly so as to be disengaged from the bearing 98 and the slotted opening 96 in the front column 18 which will then make it possible to remove the spit vertically upward through the slot 19. The back flange of the cover 86 may be coped so that the sides of the coping may engage the outer surfaces of the column member 20 and thus aid in vertical alignment when assembled upon the supports 88.

Attached to the inside surface of the end section 16 and also to each side of the intermediate partitions 102 between the units are drip plate angle or supporting members 48 provided with displaced tongues formed by slots 49, which tongues retain the drip plate 46 detachably secured to sections 16 and partitions 102. This is shown clearly in detail in Fig. 1 and 6. This preferred design makes the drip plates 46 easily removed for cleaning and replacement. Directly beneath and preferably equidistant from each pair of the spits 50 is a drip pan 34 into which the drip plates 46 direct or convey the juices dropping from the roasting products. Framing the pan 34 is a flanged front panel 36 which, in addition to design finishing, acts as a means for preventing the juices and drippings from splashing or seeping to the outside of the machine. On the front panel of the pan 34 is a handle 38 used in sliding the pan in and out of the machine. The lower portions of the vertical sides of the pans 34 engage runner or guide angles 32 which are fastened to the base 28 and are so positioned as to permit easy sliding of the pan.

Under certain circumstances such as for outdoor use, it may be desired to have an open top type of rotisserie. In this event, the present invention readily is adapted to satisfy this need simply by removing the top front and rear channels 24 and 26, together with the top glass doors or panels and the clip angles 42. If desired, the upper ends of the column members 18 and 20 then each may be provided individually with top finishing members, of an ornamental nature, not shown. The other features and elements of each unit of the rotisserie will otherwise function as when the top panels 22 are used.

Throughout the units, where a number of items are used in each unit such as the rear panels 14, the glass front panels 12, front filler or bracing panels 40, end sections 16, angles 42, and the like, all of each kind of item are uniform in size and shape, thereby minimizing construction and manufacturing cost of the units. Assembly requires no special tools, welding or other expensive procedures.

The specific dimensions of the units are optional. However, it is conceivable the units could serviceably and conveniently be of the order of about 16" wide, about 36" to 40" long, and from about 16" to 24" high. Preferably the tops of the units are disposed a little over waist high when mounted for use. Hence, the units may be placed upon a low counter or platform. The glass front panels 12 and transparent top panels 22 permit ready viewing of the roasting products by both the chef and customers. The entire device readily is cleansed and the renderings and drippings are collected efficiently by slidable pans 34.

Safety for the operator or chef also is afforded by the shielding effect of panels 14 and 15, as well as the readily detachable covers 86. When the covers 86 are removed however, the spits may be removed with ease from the units with the roasted products thereon. When the spits are of substantial length, it may be desirable to facilitate the handling thereof, both in removing the spits from and installing them within the bearings therefor, to utilize any convenient type of hook-like auxiliary handle which may be positioned to engage the spit midway of the ends thereof, thus in conjunction with handle 56 affording a pair of handles for each spit during such operations.

Further, it will be seen that the preferred arrangement of the heating units is such that they afford maximum roasting effects with minimum possibility of the heating units becoming spattered with grease and other renderings which might otherwise drop onto the heating unit and become charred thereon, being unsightly and also decreasing the efficiency thereof. Further, there is minimum danger of the operator being burned during loading or unloading of the rotisserie units. Each heating unit also is controllable individually as to degree of heat desired. The wiring circuit needed for installation of any number of units simply requires a standard electric outlet connection for each unit. However, it is to be understood that other heating means may be used such as longitudinal gas burner tubes, controlled by valves for each unit, if desired.

As has been stated above, the present invention lends itself to being made preferably in the form of units comprising two spits each. The first unit for example will be entirely self contained and also include the motor 64 and top extension 76 and braces 78 therefor in order to permit the slidable movement of the top glass panel 22 thereof to open position. Said initial unit also includes two preferably metallic end sections 16 which are substantially U-shaped in cross-section as shown in Fig. 3. Such unit also includes a single rear panel 14 and a front glass panel 12.

A second unit to be added to the above described first unit however will not be a duplicate of said first unit in that upon an expansion of the first unit into an assembly of multiple units of, for example, two spits each, the additional unit preferably will differ from the initial unit by such additional unit not including any end sections 16 since one of the end sections of the initial unit is disconnected therefrom and used as the end section of the assembly of units when such assembly is completed. Hence, said additional unit as well as any successive additional units preferably will comprise a bottom plate 28, a partition 102, two bracing member plates 40, two front column members 18, two rear column members 20, two glass front panels 12, two rear panels 14, additional channels 24 and 26 for the cover panel, one slidable cover panel 22 and handles therefor, two spits 50, one heating unit 58 and switch 62 therefor, one section of drive shaft 68 with gears and coupler 66, two handle covers 86, one drip pan, two drip plates 46, and all necessary clip angles 42, column base angles 30, as well as the screws used in connecting all of the elements into an assembly.

It is relatively simple to assemble the additional elements of the new unit being added to the initial unit or assembly of units such for example, as adding the new base plate 28 to the endmost base plate of the original unit or assembly, as shown in detail in Fig. 14, connecting the members 18 and 20 to the bottom plate 28, assembling the various glass front panels 12 and rear panels 14 in the grooves of said column members, as well as also connecting the displaced end section 16 to certain of said columns, attaching the guide channels 24 and 26 for the cover panel, inserting the additional slidable cover panel 22 and arranging the handle thereon to cooperate with the handles of the adjoining units, and then assembling the internal components of the unit comprising the spits 50, heating unit 58, the driving mechanism and electrical controls, as well as the drip pan 34 and drip plates 46.

Still additional units may be added to the assembly described above when occasions demand by repeating the operations recited in the foregoing.

Further, in conventional rotisseries having multiple spits which usually are mounted either on vertical axes or in vertical planes so as to be one above another while individual spits extend horizontally, the renderings from the products on the upper spits drop to the products upon the lower spits. Where different products are involved such as chicken and fish, such mixing of flavors is highly undesirable. Also, in such arrangement of spits in a vertical plane, considerable high reaching is required to load and unload the uppermost spits. All of these difficulties are overcome by the present invention. No difficult reaching is required; fish may be roasted beside ham or chicken, either on the same spit or upon adjacent spits; and expansion of the assembly of units to any reasonable extent desired is possible, with no inconvenience.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A rotisserie unit comprising in combination, a cabinet including a bottom, side and end members extending vertically from said bottom, a plurality of spits rotatably supported independently within fixed pairs of bearings within the ends of said cabinet, said spits being substantially horizontally in spaced side-by-side relation to each other, elongated heating means extending horizontally within said cabinet substantially in parallelism with said spits, means operable to rotate said spits, a drip pan removably mounted in the lower portion of said cabinet at a lower level than said spits, shield plates extending angularly downward and inward from opposite sides of said cabinet to said drip pan and operable to direct drippings to said pan during roasting operations of said unit, and means detachably connecting said shield plates to said sides of said cabinet, whereby said shield plates readily may be removed for cleansing.

2. A rotisserie barbecue unit comprising in combination, a base member, pairs of vertical members each having a bearing therethrough and extending upwardly from one pair of opposite edges of said base member, said vertical members having grooves in opposite edges thereof, front and rear end panels extending respectively between each pair of vertical members, side wall sections extending upwardly from the other opposite pair of edges of said base member and the vertical edges of said side wall sections engaging said pairs of vertical members and in conjunction with said end panels comprising enclosing sides and ends of a cabinet for said unit, the opposite edges of said front and rear end panels and said side wall sections being received within the grooves of said vertical members, spits extending substantially horizontally within said cabinet between said pairs of vertical members for support by said bearings in side-by-side relationship to each other, elongated heating means within said cabinet between said spits therein and operable to roast items upon said spits, a drip pan within said cabinet beneath said heating means, and shield means extending angularly downward from opposite sides of said cabinet to said pan and detachably connected to said sides, said shield means being operable to direct dripping to said pan during roasting operations.

3. A rotisserie barbecue unit comprising in combination, a base member, pairs of vertical members extending upwardly from a pair of opposite edges of said base member and having receiving means in opposite edges thereof, front and rear end panels extending respectively between said pairs of vertical members and the opposite edges of said panels being received within the receiving means of said vertical members, side wall sections extending upwardly from the other pair of opposite edges of said base member and the vertical edges of said side wall sections being received within said receiving means of said end vertical members, said panels and side wall sections comprising a cabinet for said unit, spits extending substantially horizontally within said cabinet between said front and rear end panels in side-by-side relationship and supported by bearings fixed relative to said front and rear end panels, heating means within said cabinet adjacent said spits and parallel thereto and operable to roast items upon said spits, a drive shaft extending horizontally between and supported by bearings carried by the vertical members on one side of said cabinet, the axis of said shaft being below the axes of said spits, and interengaging gear means on said spits and drive shaft operable to drive said spits and selectively permit ready disengagement of said spits from said drive shaft by elevation of said spits from said drive shaft and separation of said spits from the bearings therefor.

4. A rotisserie barbecue unit comprising in combination, a base member, a pair of vertical members extending upwardly from each of a pair of opposite edges of said base member and having grooves in opposite edges, front and rear end panels extending respectively between each pair of vertical members, the vertical edges of each panel being received in the grooves of said vertical members, end wall sections provided with inturned ends and extending upward from opposite edges of said base member, the vertical edges of the inturned ends of said end wall sections also being received within the grooves in pairs of said vertical members and in conjunction with said end panels comprising enclosing sides and ends of a cabinet for said unit, spits extending substantially horizontally within said cabinet between said pairs of vertical members for support thereby in side-by-side relationship within bearings in said vertical members, and heating means within said cabinet extending longitudinally between the spits therein and operable to roast items upon said spits.

References Cited in the file of this patent

UNITED STATES PATENTS

| | | |
|---|---|---|
| D. 168,786 | Feinstein | Feb. 10, 1953 |
| 1,642,604 | Cox | Sept. 13, 1927 |
| 2,400,150 | Jones | May 14, 1946 |
| 2,569,763 | Hofferberth | Oct. 2, 1951 |
| 2,588,091 | Dornbush | Mar. 4, 1952 |
| 2,618,730 | Panken | Nov. 18, 1952 |
| 2,636,431 | Baltz et al. | Apr. 28, 1953 |
| 2,722,882 | Wilson | Nov. 18, 1955 |